United States Patent [19]

Rudd et al.

[11] Patent Number: 4,940,205
[45] Date of Patent: Jul. 10, 1990

[54] DUPLEX LENS

[76] Inventors: Milo Rudd, 2119 NE. 15th Ter., Ft. Lauderdale, Fla. 33305; Jerome Bakalar, 3660 Inverrary Blvd., Apt. MIJ, Landerhill, Fla. 33319

[21] Appl. No.: 34,510

[22] Filed: Apr. 6, 1987

Related U.S. Application Data

[63] Continuation-in-part of Ser. No. 816,197, Jan. 6, 1986, Pat. No. 4,664,854.

[51] Int. Cl.⁵ .................. B29D 11/00; B29C 39/12
[52] U.S. Cl. ....................... 249/63; 249/158; 249/161; 264/1.8; 425/808
[58] Field of Search .......... 264/1.7, 1.8, 2.4, 1.1, 264/2.2, 2.5, 2.7; 425/466–468, 808, DIG. 5, DIG. 10, DIG. 247, 577; 249/93–97, 63, 155, 158, 159, 160; 350/409, 417, 480; 351/168, 172, 177

[56] References Cited

U.S. PATENT DOCUMENTS

| | | | |
|---|---|---|---|
| 2,026,606 | 1/1936 | Bausch | 351/177 |
| 3,273,204 | 9/1966 | Craddock | 264/2.4 |
| 3,507,076 | 4/1970 | Rudd et al. | 351/177 |
| 4,184,835 | 1/1980 | Talbot | 425/808 |
| 4,279,401 | 7/1981 | Ramirez et al. | 264/1.8 |
| 4,452,420 | 6/1984 | Lundquist | 249/175 |
| 4,664,854 | 5/1987 | Bakalar | 264/2.2 |

FOREIGN PATENT DOCUMENTS

| 1177319 | 9/1964 | Fed. Rep. of Germany | 249/175 |
|---|---|---|---|
| 59-131429 | 7/1984 | Japan | 264/1.1 |

*Primary Examiner*—Jeffery Thurlow
*Assistant Examiner*—Mathieu Vargot
*Attorney, Agent, or Firm*—James R. Longacre; Michael L. Keller

[57] ABSTRACT

A method and apparatus for forming a laminated bifocal lens which includes forming a frontal lens component having a bifocal element in a substantially stress-free manner and bonding the frontal lens component to a rear lens component which is also formed in a substantially stress-free manner. The laminated lens so provided may be inexpensively formed, is lightweight, and has optimum optical and physical characteristics.

3 Claims, 4 Drawing Sheets

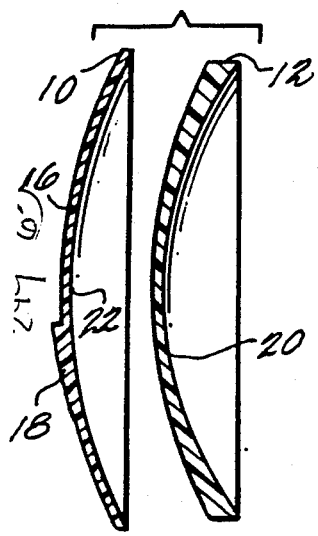
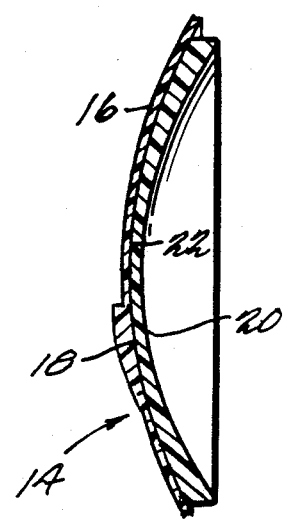
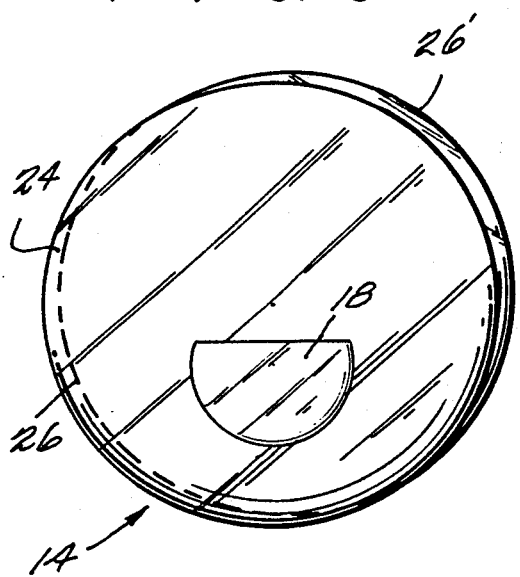
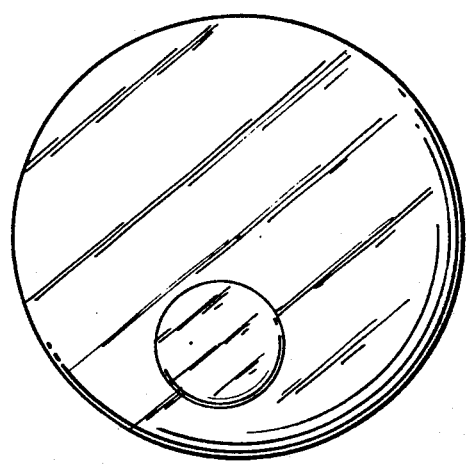

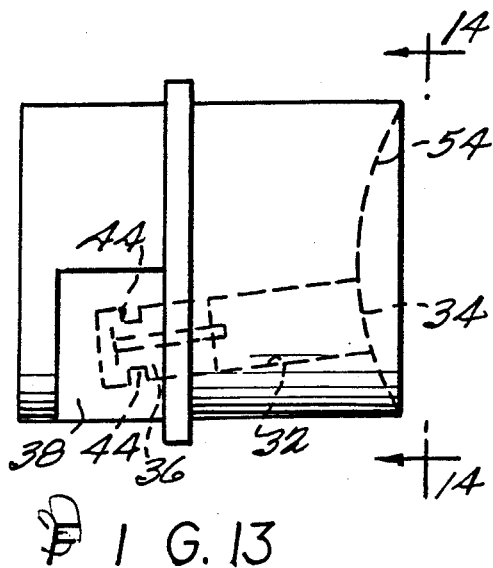
FIG. 13
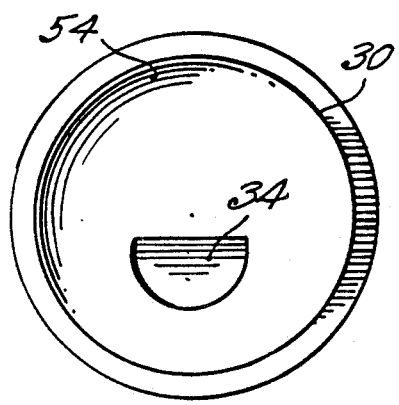
FIG. 14
FIG. 15
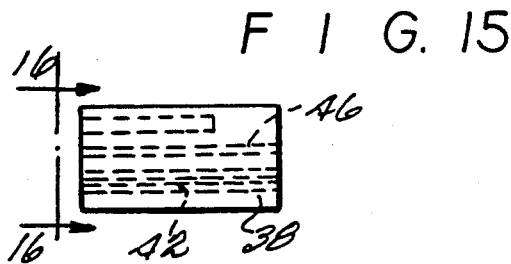
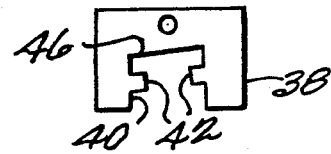
FIG. 16
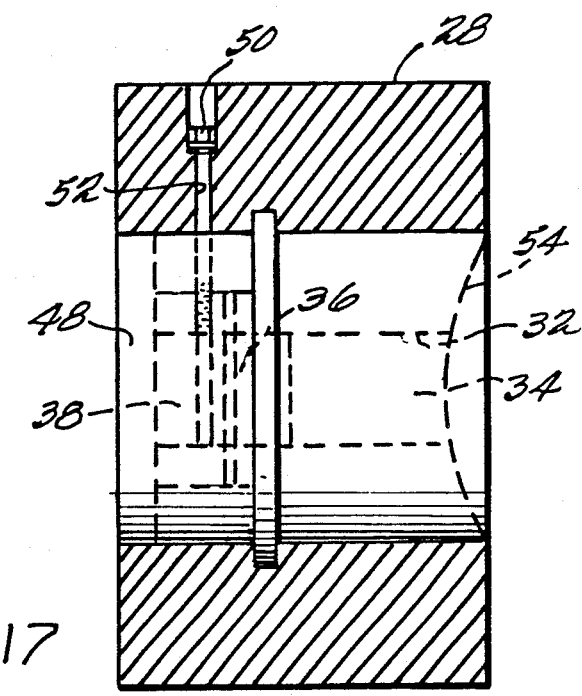
FIG. 17

DUPLEX LENS

This is a continuation-in-part of Ser. No. 816,197, filed 1-6-86 now U.S. Pat. No. 4,664,854.

BACKGROUND OF THE INVENTION

The present invention relates to laminated multifocal lenses and, more particularly, to composite plastic lenses with an outer veneer lens carrying a bifocal element and an inner lens which is the prescription base.

The formation of bifocal lenses has been a generally difficult and expensive undertaking because of the variety of different and conflicting requirements which must be mutually reconciled in forming each lens. The expense involved has been relatively high because these lenses are commonly formed from glass and CR39 (allyl diglycol), a cast molded plastic, the grinding of which is very expensive and difficult. The conflicting requirements necessary for each lens in view of the great number of different combinations of compound bifocal prescriptions as well as cosmetic requirements have also contributed to the high cost of bifocal lenses.

In an effort to reduce the weight of bifocal lenses as well as manufacture the same more rapidly and inexpensively, multifocal lenses have been molded from thermoplastic resins such as polycarbonate resin. In order to be commercially acceptable, however, lenses must be free of blemishes and distortions and have edge proportions free from starring that can result from non-uniform setting within the mold cavity. These optical properties of molded lenses are very difficult to control. In particular, in order to ensure adequate optical and other physical properties of such a molded lens, a number of parameters, including the quantity and temperature of the resin, mold temperature, clamp pressure, speed and pressure with which the resin is injected, pressure that the molding members apply to the resin entrapped in the fill cavity and the duration of the various molding steps must be controlled.

In addition, it is crucial that polycarbonate lenses, for example, be produced having a minimum of stress. One approach that minimizes stress is uniform application of molding pressure in the direction of the thickness of the lens blank throughout the extent of the major surfaces of the blank, at least during the period of time when the resin is setting. In order to obtain a uniform application of molding pressure, the charge of molten thermoplastic material must fill the cavity completely so that the opposite molds will engage throughout their entire extent at both major surfaces of the molten charge. This engagement also ensures that the lenses being formed are not stressed along the edge portions during molding. Accordingly, starring is minimized. The minimization of starring is important since when an optometrist edges or machines a lens blank to conform to the shape of an eyeglass frame, the presence of starring and the resultant edge weakness, may lead to breakage or distortion of the lens.

An additional consideration when bifocal lens are being injection molded is that it is imperative that extremely accurate positioning of the bifocal segment in relation to the spherical base curve be maintained. During the injection process both the bifocal segment and spherical base curve are subjected to pressures of varying intensity which can cause deflection of the bifocal segment relative to the base curve. When this occurs, the lens can flash or an uneven transition point to or from the bifocal segment can be produced which will render the lens useless. Furthermore, since these pressures can vary due to several parameters, continuous adjustment of the bifocal segment position is required. The resultant down time of injection molding machines while the mold is disassembled in order to readjust the bifocal segment becomes a significant detriment to machine efficiency.

It would be desirable to provide laminated bifocal lenses that are lightweight, inexpensive, and can be readily formed in accordance with a given prescription from a relatively small number of component lenses maintained in stock.

It would also be desirable to form laminated bifocal lenses from thermoplastic components so that they can be inexpensively and rapidly produced.

It would also be desirable to be able to form the component portions of such a laminated bifocal lens so that they are substantially free from stress, as well as blemishes and distortions, and hence have optimum optical characteristics.

It would further be desirable to provide an adjustment mechanism for the position of the bifocal segment relative to the spherical base curve that is externally accessible so that the bifocal segment can be readjusted without necessitating disassembly of the molding station. Such an adjustment mechanism would also allow optimum surface transition to be provided by allowing the user to compensate for the deflection of the bifocal segment in relation to the base curve.

Finally, it would be advantageous to provide a molding apparatus capable of molding bifocal segments of varying powers on a given base curve by merely interchanging the bifocal segment and readjusting the segment position.

SUMMARY OF THE INVENTION

It is an object of the present invention to provide a laminated bifocal optical lens which overcomes the aforementioned deficiencies of the prior art.

According to the present invention, an ophthamalic lens is formed by permanently bonding two thermoplastic components together, such as a meniscus carrying a bifocal capability on the front surface bonded to a rear meniscus carrying the optical prescription on its rear surface. The arced inner surface of the bifocal meniscus has the same curvature as the front surface of the rear meniscus so that a particular bifocal element can be chosen and mounted to a particular base prescription in accordance with a given patient's prescription.

Further, each of the lenses forming the bifocal laminated lens of the present invention is formed by a molding apparatus and process which enable the uniform application of pressure to the lens blank and, hence, is substantially stress-free.

Other objects, features, and characteristics of the present invention, as well as the methods of operation and functions of the related elements of the structure, and the combination of parts and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

FIG. 1 is a cross-sectional view of front and rear lenses formed in accordance with the present invention before cementing;

FIG. 2 is a cross-sectional view of front and rear lenses formed in accordance with the present invention after cementing;

FIG. 3 is a front view of a flat-top bifocal lens formed in accordance with the present invention;

FIG. 4 is a front view of a kryptok bifocal lens;

FIG. 13 is a side elevational view of a female mold for forming a bifocal lens in accordance with the present invention;

FIG. 14 is a view taken along line 14—14 of FIG. 13;

FIG. 15 is a cross-sectional view of a bifocal segment adjustment wedge formed in accordance with the present invention;

FIG. 16 is a view taken along line 16—16 of FIG. 15;

FIG. 17 is a view taken along line 17—17 of FIG. 13.

DETAILED DESCRIPTION OF THE PRESENTLY PREFERRED EXEMPLARY EMBODIMENT

Referring to FIGS. 1-2, the finished lens assembly of the present invention is comprised of two lens elements 10 and 12, which are cemented together in an aligned position to produce an "uncut" lens 14, which is a lens that is in finished optical condition and needs only to have its edge shaped and sized for mounting in the frame of the wearer's choice.

Figure 5:
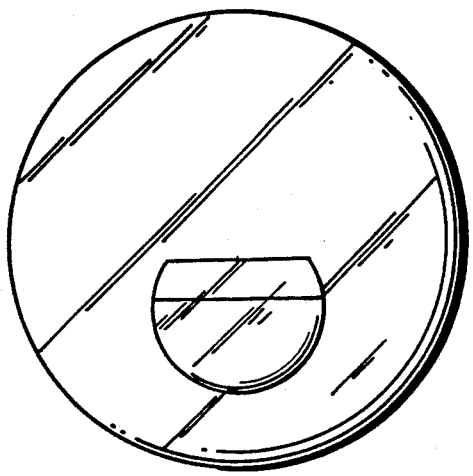
FIG. 5 is a front view of a flat-top trifocal lens.
Figure 6:
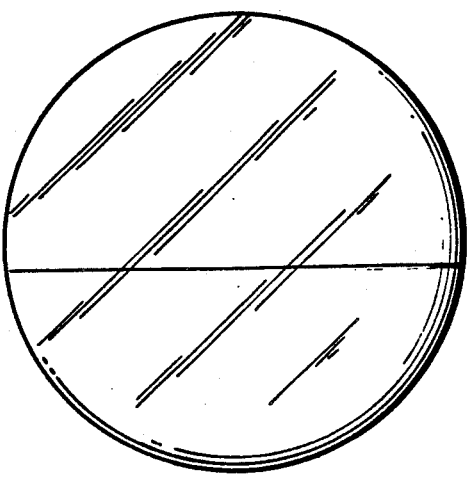
FIG. 6 is a front view of a full-field bifocal lens.
Figure 7:
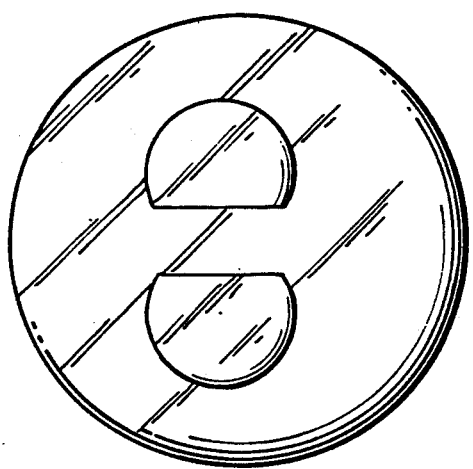
FIG. 7 is a front view of a double D bifocal lens.

The front lens element 10 has a polished spherical outer surface 16. The curve of this surface is selected so as to afford reduced lens aberrations (primarily astigmatism and curvature of field) when used with a range of prescription powers. Surface 16 surrounds a reading segment area 18 having a polished, spherical surface of steeper curvature suitable for providing the desired reading power in the finished lens assembly. The shape of reading area 18 shown in FIGS. 1-3 is known in the trade as a "flat-top bifocal" segment. However, this disclosure applies equally well to all other shapes and combinations of multifocal lens assemblies which have well-defined areas of specific powers used for other than distance vision. Examples of these other multifocal forms are shown in FIG. 4, a "kryptok" bifocal; FIG. 5, a flat-top trifocal; FIG. 6, a "full-field" or "executive" bifocal; and FIG. 7, a "double-D" bifocal for vocational use.

The rear lens element 12 has a polished outer surface 20 which is spherically or toroidally curved. The curvature of surface 20, acting in conjunction with the curve on surface 16, the thickness of the lens assembly 14, and the index of refraction of lens elements 10 and 12, is so chosen as to provide the vision corrections required by the patient's prescription.

Figure 8:
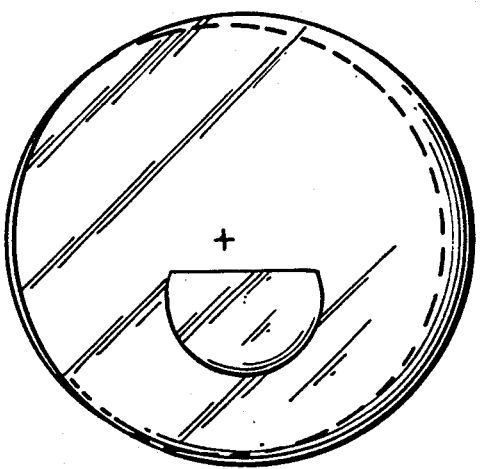
FIG. 8 is a front view showing a lens position to provide a lens assembly for the right eye.
Figure 9:
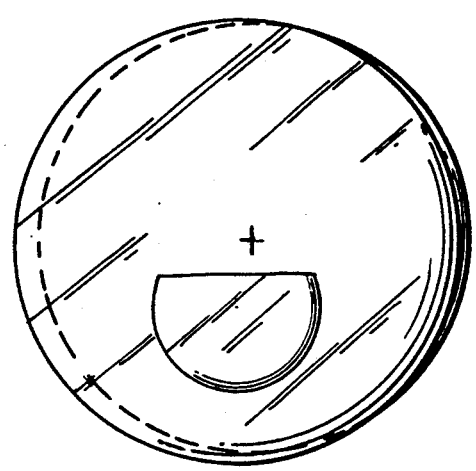
FIG. 9 is a front view of a lens assembly suited for a left eye lens.
Figure 10:
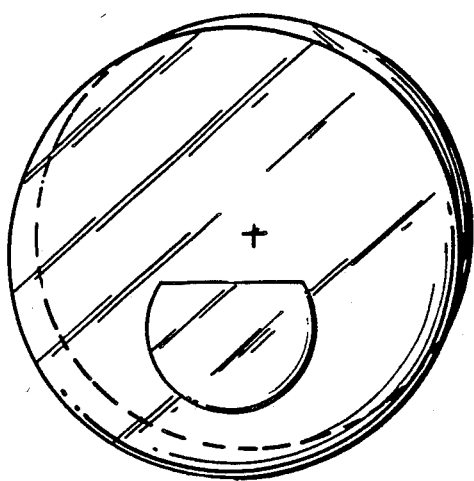
FIG. 10 is a front view of the lens of FIG. 9 with the front lens positioned to have a lower reading segment.
Figure 11:
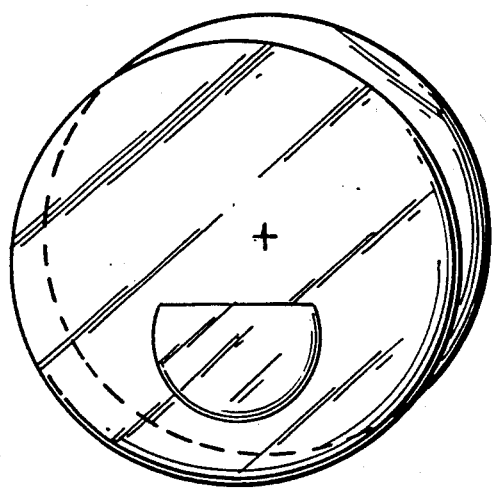
FIG. 11 is a front view of an offset reading segment which provides correction for aphakic condition.
Figure 12:
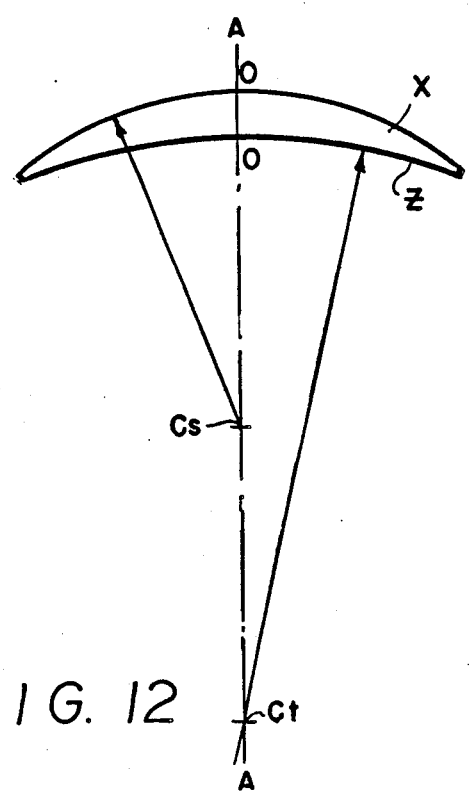
FIG. 12 is a side elevational view showing the radial relationships between the front surface of a lens and the rear surface of a lens.

Referring again to lens element 10 shown in FIGS. 1-3, the rear surface 22 of lens element is spherically polished. Further, by making the spherical curves 16 and 22 concentric (with the same center), it is possible to assemble elements 10 and 12 with the bifocal segment 18 positioned as needed for prescription requirements. For example, referring to FIG. 12, a spectacle lens prescription includes data for determining the horizontal and vertical positions of the reading segment in relation to the optical center of the lens. More particularly, a single lens such as element X, with spherical surfaces, is symmetrical about an axis A—A which goes through the centers of curvature Cs and Ct of the two surfaces. Axis A—A intersects lens surfaces Y and Z at O, which is the optical center. At O, surfaces Y and Z are parallel. Lens 10, however, with its concentric surfaces, is a special case. Any line through the single center of curvature intersects the lens at a point where the foregoing description of the optical center is valid. Accordingly, lens 10 can be placed in contact with lens 12 at any desired position without having to shift the optical center O of lens 12. Therefore, when the lens element 10 has concentric curves 16 and 22, the position of the optical center of the lens assembly 14 coincides with the optical center of lens 12. This means that the optical center remains at the optical center of lens 12 regardless of the displacement of lens 10 when it is placed in contact with lens 12 and cemented. Therefore, in accordance with the present invention, first and second lenses can be quickly and easily selected and coupled together regardless of the prescription being filled and without undue waste of lens material. For example, FIGS. 8 and 9 show lenses 10 positioned to provide lens assemblies suited for the right and left eye lenses, respectively, of a prescription; FIG. 10 shows lens 10 positioned to have the reading segment lower in the lens assembly than in FIG. 9. FIG. 11 shows a specially offset reading segment which provides correction for an aphakic condition.

Indeed, in past embodiments of spectacle lenses of cemented construction, the inner and outer surfaces of the front lens have radii of curvature which are substantially different and are thus far from being concentric. Depending upon the division of total lens assembly power between the front and rear lenses, the prescription lens power required, and the amount of offset of the reading segment from the optical center of the lens assembly, the useful overlapping area of the lens may or may not be large enough to result in a lens assembly area of the necessary size. In fact, in many cases either the relative displacement of the lenses will be so large that the resulting cemented area is too small to permit cutting out a finished lens assembly of the intended size, or one or both lenses would have to be made larger than would otherwise be needed.

A further advantage of the concentric curve principle is that lens 12 can also be produced unchanged for single vision lens use, resulting in a significant reduction of inventoried types and the associated tooling.

If the curves of surfaces 16 and 22 of lens 10 are precisely concentric, the added thickness, for example 1 mm, from cementing lens 10 to a single vision lens 12 will alter the power of the assembly from that of lens 12 by an amount in the order of 0.02 to 0.10 diopters. This error can be avoided entirely by changing the curvature of surface 16 by the small amount necessary to compensate exactly for the error.

As an example, consider a lens 1 mm thick, with a surface 16 having a spherical radius of 85.80 mm and a surface 22 having a 84.80 mm radius concentric with surface 16. When this lens is cemented to lens 12 the power of the assembly will be about −0.06 diopters different from that of lens 12 alone. By using an 85.11 mm radius for surface 14, the assembled lens will have the same power as lens 12. The amount of displacement required for achieving a desired segment location is not appreciably affected by this small departure from strict concentricity of the surfaces 16 and 22.

As discussed above, the finished uncut lens assembly must have its reading segment accurately displaced from the optical center of the assembly. Further, the axis of the toroidal surface 20, known in the trade as the cylinder axis, must have the angular position, relative to reading segment 18, which is specified in the lens prescription. These two alignments are achieved by placing lenses 10 and 12 in a specially constructed cementing jig (not shown), where they are initially held separated, as in FIG. 1. Alignment marks 24 and 24' (FIG. 3) on surface 16, together with the edge of lens 10, serve as positioning means by which the reading segment displacement is controlled. Scaled movements of the jig member supporting lens 10 serve to displace the lens by precisely the required amount.

The cementing jig locates lens 12 by its diameter and surface 20. The lens can be rotated about is center, thereby enabling the cylinder axis, defined by the marks 26 and 26' (FIG. 3) on surface 20, to be turned to the specified angular position. The amount of lens rotation is governed by indexing the marks 26 and 26' with a divided circle surrounding the diameter of the lens.

After lenses 10 and 12 have been positioned in the jig, a suitable quantity of lens cement is placed between them. The lenses are brought into contact, the cement is caused to flow to join the assembly without voids, and the cement is then set up by a curing operation suitable to the cement used. A satisfactory cement for this purpose is NOA Type 68, manufactured by Norland Products, Inc. The cement is supplied as a viscous liquid and is rapidly cured by placing the lenses near a UV source.

The molding station for forming the bifocal lens of the compound or duplex lens of the present invention will now be described in greater detail.

The frame of the molding station includes a movable frame member (not shown) which rigidly supports a male mold (not shown). The movable frame member may be moved horizontally so that the male mold attached thereto is adjustable between a molding position and an unloading position. Further, the male mold has a convex molding surface conforming to the curvature desired for one major surface of the lens. In particular, the curvature is chosen so that the mold will produce a lens having a concave surface curvature corresponding to the convex surface curvature of the prescription base lens to which it is bonded, as will be described more fully below. The movable frame member and male mold are preferably of the type disclosed in either of my earlier U.S. Pat. Nos. 4,664,854 or 4,778,632 the disclosure of both of which are incorporated herein by reference.

The frame of the molding station further includes a fixed frame member 28 (shown generally in FIG. 17) which supports a female mold assembly. Female mold 30 is mounted to the frame either in free-floating relation as disclosed in my earlier U.S. Pat. No. 4,664,854 or so as to be automatically retractable as disclosed in my earlier U.S. Pat. No. 4,778,632. Female mold 30 has a molding surface of substantially concave configuration which conforms to the curvature desired for the outer, convex surface of the lens.

In the preferred embodiment, the curvature of the female mold is the same as that of the male mold so that the lens formed at this molding station, except the bifocal component, is a plano lens, i.e. has zero optical power, and merely acts as a carrier for the bifocal component. Thus, the rear lens of the laminated lens determines the prescription power through the curvature of the rear face thereof, as will be described more fully below.

In order to form the bifocal or multifocal component of the front lens, female mold 30 defines a bifocal segment cavity 32 which is offset and dropped relative to the center thereof for receiving a segment insert 34 (FIGS. 13 and 14). Segment insert 34 defines the thickness and curvature of the bifocal component of the front lens. Of course, the particular segment insert provided within the aperture is determined by the particular optical power size and shape of the bifocal component to be formed. As will become more apparent below, however, the segment insert can be quickly and easily removed and replaced. Thus, by providing a number of inserts, each defining a particular optical power for the multifocal element, a plurality of different front lenses for the laminated lens may be quickly and inexpensively produced. Accordingly, optical laboratories can be provided with a stock of various frontal lenses having substantially standard increments of bifocal power. To fill a prescription, the technician need only match the desired frontal lens with a rear lens carrying the desired prescription base. The front and rear lenses so chosen are then bonded together in a suitable manner so as to form the laminated bifocal lens.

Referring more particularly to the structural components of the fixed frame member, the female mold and bifocal segment, the structure and method by which the frontal lens with a bifocal or multifocal segment can be formed so as to have an even transition point to the bifocal segment, i.e., so that the circular edge of the segment area joins the base curve 16 without a step, will be more fully understood.

Referring to FIG. 13, a suitable bifocal segment insert 34 is fixedly secured to a segment actuator 36 with a screw 37 or the like. Bifocal segment insert 34 and segment actuator 36 are slidably received within a bifocal segment cavity 32 defined in female mold 30.

A position control slide 38 which includes a recess 40 sized so as to receive the end of segment actuator 36 is then slidably engaged with segment actuator 36. As can be seen, position control slide 38 includes first and second projections 42 which engage corresponding recesses 44 in segment actuator 36. Furthermore, the recess 40 defined in position control slide 38 has an inclined bottom wall 46 (FIGS. 16 and 17), as will be described more fully below. A retainer cap 48 is then affixed to female mold 30 to enclose slide 38 and segment actuator 36 as well as bifocal segment 34 coupled thereto within the mold frame 28.

An adjusting screw 50 is further provided and threadably received in a bore 52 defined in frame 28. The innermost end of screw 50 is operatively coupled in any suitable manner to slide 38 so that when adjusting screw 50 is turned, position control slide 38 is moved to the right or to the left as shown in FIG. 17. Further, because bottom wall 46 of recess 40 is slightly inclined longitudinally as can best be seen by the inclination of the dashed lines in FIGS. 15 and 17, movement of control slide 38 relative to mold 30 will cause segment actuator 36, through the interlocking, abutting coupling between control slide 38 and segment actuator 36, to move upwardly or downwardly as shown in FIG. 17. In this manner, bifocal segment 34 can be finely adjusted relative to the base curve 54.

When it is desired to form a particular bifocal lens with the molding station, a suitable bifocal insert 34 is selected and mounted to mold 30, as was discussed above. Adjusting screw 50 is then rotated to move control slide 38 to the right or to the left. Movement of the control slide 38 in this manner in turn alters the position of segment actuator 36 and hence of bifocal segment insert 34 relative to the spherical base curve 54. If later adjustment is necessary, adjustment screw 50 can be rotated from the mold exterior. Thus, in accordance with the present invention, adjustments can be readily made to obtain optimum surface transition without dismantling the mold. Further, because the bifocal segment insert and adjustment mechanism of the present invention are mounted in a molding station of the type disclosed in my earlier U.S. Pat. No. 4,664,854 or in my earlier U.S. Pat. No. 4,778,632 the disclosures of which have been incorporated herein a bifocal lens formed in accordance with the present invention will have a minimum of stress.

While the invention has been described in connection with what is presently considered to be the most practical and preferred embodiment, it is to be understood that the invention is not to be limited to the disclosed embodiment, but on the contrary is intended to cover various modifications and equivalent arrangements included within the spirit and scope of the appended claims.

What is claimed is:

1. An apparatus for molding a bifocal lens component comprising:
    a fixed frame member;
    a female mold supported in said fixed frame member, said female mold defining an aperture spaced from a central axis thereof and extending longitudinally therethrough;
    a segment insert disposed within said aperture of said female mold; and
    means operatively coupled to said insert for adjusting the position of said insert relative to said female mold, wherein said means for adjusting include an adjustment slide slidably received in said female mold for movement in a first direction, said adjusting means being coupled to said insert so that movement of said adjustment slide in said first direction urges said insert to move in a second direction, substantially perpendicular to said first direction, and wherein said insert is rigidly coupled to an actuator element which is slidably mounted to said adjustment slide, and wherein said adjustment slide includes a longitudinal recess, said actuator being slidably received in said recess.

2. An apparatus as claimed in claim 1 wherein said recess has an inclined base wall.

3. An apparatus as claimed in claim 2, wherein said actuator element is retained in said recess by means of a sliding, interlocking engagement between longitudinal projections formed along the side walls of said recess and longitudinal recesses defined along the longitudinal side surfaces of said actuator element.

* * * * *